United States Patent [19]

Wellner et al.

[11] Patent Number: 4,719,278

[45] Date of Patent: Jan. 12, 1988

[54] PROCESS FOR THE PREPARATION OF THIXOTROPIC BINDERS, THE BINDER OBTAINABLE BY THIS PROCESS AND THEIR USE FOR THE PREPARATION OF COATING AND SEALING COMPOUNDS

[75] Inventors: Wolfgang Wellner, Bergisch Gladbach; Hermann Gruber, Leverkusen; Alois Fehlbier, Burscheid, all of Fed. Rep. of Germany

[73] Assignee: Bayer Aktiengesellschaft, Leverkusen, Fed. Rep. of Germany

[21] Appl. No.: 26,928

[22] Filed: Mar. 17, 1987

[30] Foreign Application Priority Data

Mar. 29, 1986 [DE] Fed. Rep. of Germany ....... 3610729

[51] Int. Cl.$^4$ ............................................. C08G 18/10
[52] U.S. Cl. ................................................... 528/64
[58] Field of Search .......................................... 528/64

[56] References Cited

U.S. PATENT DOCUMENTS

| | | | |
|---|---|---|---|
| 3,547,848 | 12/1970 | Marsh et al. | 260/22 |
| 4,374,210 | 2/1983 | Ewen et al. | 528/64 |
| 4,383,068 | 5/1983 | Brandt | 524/196 |
| 4,463,126 | 7/1984 | Gruber et al. | 528/64 |

Primary Examiner—Maurice J. Welsh
Attorney, Agent, or Firm—Gene Harsh; Joseph C. Gil; Thomas W. Roy

[57] ABSTRACT

The present invention is directed to a process for the preparation of air drying binders containing free isocyanate groups, having thixotropic properties and prepared by reacting aromatic diamines which have at least one alkyl substituent in the ortho position to each amino group with either prepolymers or semi-prepolymers containing free isocyanate groups and based on polyisocyanate mixture of the diphenylmethane series containing at least 20% by weight of 2,4'-diisocyanatodiphenylmethane and organic polyhydroxyl compounds or mixtures of these prepolymers or semi-prepolymers with prepolymers or semi-prepolymers based on other organic polyisocyanates, provided that the mixture contains at least 3% of the prepolymers or semi-prepolymers based on polyisocyanate mixtures of the diphenylmethane series. The invention further relates to the binders produced by this process and their use for the preparation of coating and sealing compounds which harden under the influence of atmospheric moisture.

9 Claims, No Drawings

PROCESS FOR THE PREPARATION OF THIXOTROPIC BINDERS, THE BINDER OBTAINABLE BY THIS PROCESS AND THEIR USE FOR THE PREPARATION OF COATING AND SEALING COMPOUNDS

BACKGROUND OF THE INVENTION

1. Field of the Invention

This invention relates to a new process for the preparation of novel air drying, thixotropic binders containing free isocyanate groups by the reaction of selected prepolymers or semi-prepolymers containing free isocyanate groups with selected aromatic diamines, the thixotropic binders obtainable by this process and their use for the preparation of coating and sealing compounds which are air drying i.e. capable of hardening under the influence of atmospheric moisture.

2. Description of the Prior Art

Polyurethane based binders containing free isocyanate groups and capable of hardening under the influence of atmospheric moisture are easily processed and therefore widely used, in particular for the preparation of coating and sealing compounds.

Thixotropic flow properties of such coating and sealing compounds would be desirable for many purposes, for example for the formation of thick coatings.

It was therefore an object of the present invention to provide air drying binders with thixotropic properties containing free isocyanate groups.

It was surprisingly found that this problem could be solved by means of the process according to the invention described below. The invention is based on the surprising observation that reaction products containing urea groups obtained from (i) isocyanate prepolymers or semi-prepolymers based on polyisocyanate mixtures of the diphenylmethane series containing a high proportion of 2,4'-diisocyanatodiphenylmethane and (ii) certain alkyl substituted aromatic diamines are suitable for rendering the above-mentioned binders thixotropic. Analogous reaction products based on conventional diisocyanates such as toluene diisocyanate are not suitable for this purpose. This finding is surprising since it is known, for example from DE-AS No. 1,805,693 or DE-AS No. 2,360,019, that reaction products of toluene diisocyanate with mono- and/or polyamines are very suitable for imparting thixotropic properties to other binders, for example those based on alkyd resins.

SUMMARY OF THE INVENTION

The present invention is directed to a process for the preparation of air drying binders with thixotropic properties containing free isocyanate groups, characterized in that either (a1) prepolymers or semi-prepolymers containing free isocyanate groups, having an isocyanate content of about 0.5 to 20% by weight and based on (i) polyisocyanate mixtures of the diphenylmethane series containing at least 20% by weight of 2,4'-diisocyanatodiphenylmethane and (ii) organic polyhydroxyl compounds having a molecular weight (average) of about 500 to 7,000 and an average hydroxyl functionality of about 1.5 to 6 or (a2) mixtures of prepolymers or semi-prepolymers containing free isocyanate groups, having an isocyanate content of about 0.5 to 20% by weight and based on (i) any organic polyisocyanate having an average molecular weight below about 300 with the exclusion of polyisocyanates of the type used for the preparation of component (a1) and (ii) subequivalent quantities of organic polyhydroxyl compounds having an average molecular weight of about 500 to 7,000 and an average hydroxyl functionality of about 1.5 to 6 with at least 3% by weight, based on the total weight of component (a2), of prepolymers or semi-prepolymers of the type mentioned under (a1)

are reacted with (b) aromatic diamines which have at least one alkyl substituent in the ortho position to each amino group at an $NCO/NH_2$ equivalent ratio of about 0.5:1 to 50:1, based on the isocyanate groups of the pure component (a1) or of the component (a1) present in component (a2) and the amino groups of component (b), provided that the equivalent ratio of isocyanate groups to amino groups, based on all of the isocyanate groups present in component (a1) or a2) and the amino groups in component (b) is at least 10:1.

The invention also relates to binders with thixotropic properties containing free isocyanate groups obtainable by this process.

Lastly, this invention relates to the use of the binders with thixotropic properties obtainable by this process for the preparation of coating and sealing compounds which harden under the influence of atmospheric moisture.

DETAILED DESCRIPTION OF THE INVENTION

The polyisocyanates used for the preparation of component (a1) of the process according to the invention include any polyisocyanate mixtures of the diphenylmethane series containing at least 20% by weight of 2,4'-diisocyanatodiphenylmethane. Mixtures of 2,4'-diisocyanatodiphenylmethane and 4,4'-diisocyanatodiphenylmethane with the optional inclusion of minor quantities of 2,2'-diisocyanatodiphenylmethane are particularly preferred. These preferred mixtures contain 20 to about 80% by weight, preferably about 40 to 60% by weight of 2,4'-diisocyanatodiphenylmethane, about 20 to 80% by weight, preferably about 40 to 60% by weight of 4,4'-diisocyanatodiphenylmethane and up to about 5% by weight of 2,2'-diisocyanatodiphenylmethane, the percentages adding up to 100 and in each case based on the total mixture. Mixtures of this kind which are free from 2,2'-isomers are most preferred. Polyisocyanate mixtures of the diphenylmethane series containing at least 20% by weight of 2,4'-diisocyanatodiphenylmethane and containing up to about 50% by weight, preferably up to about 20% by weight of trifunctional and higher functional polyisocyanates of the diphenylmethane series in addition to the above-mentioned diisocyanates may also be used although these are less preferred. Such higher functional homologues are produced in addition to the above-mentioned diisocyanates in the known process of phosgenating aniline/formaldehyde condensates.

Any aliphatic, cycloaliphatic, araliphatic, aromatic or heterocyclic polyisocyanates of the kind described, for example, by W. Siefken in Justus Liebigs Annalen der Chemie, 562, pages 75–136 are suitable for preparing the isocyanate prepolymers or semi-prepolymers which are present as mixtures with isocyanate prepolymers or semi-prepolymers (a1) in component (a2) which is optionally used in the process according to the invention. These polyisocyanates are represented by the formula $$Q(NCO)_n$$

wherein n has a value of 2 to 4, preferably 2, and

Q denotes an aliphatic hydrocarbon group having 2 to 18, preferably 6 to 10 carbon atoms; a cycloaliphatic hydrocarbon group having 4 to 15, preferably 5 to 10 carbon atoms; an aromatic hydrocarbon group having 6 to 15, preferably 6 to 13 carbon atoms; or an araliphatic hydrocarbon group having 8 to 15, preferably 8 to 13 carbon atoms.

The following are examples of such polyisocyanates: ethylene diisocyanate, tetramethylene diisocyanate, hexamethylene diisocyanate, dodecamethylene diisocyanate, 1,3-diisocyanatocyclobutane, 1-isocyanato-3,3,5-trimethyl-5-isocyanatomethyl-cyclohexane (IPDI), 4,4'-diisocyanatodicyclohexyl methane, 2,4-diisocyanato toluene, 2,6-diisocyanato toluene and any mixtures of the last two mentioned isomers or 1,5-diisocyanato naphthalene. Any mixtures of the polyisocyanates mentioned as examples may, of course, also be used.

Suitable polyhydroxyl compounds for the preparation of the isocyanate prepolymers and semi-prepolymers are of the kind known in polyurethane chemistry which have an average hydroxyl functionality of about 1.5 to 6, preferably 2 to 4, and an average molecular weight of about 500 to 7000, preferably about 1,000 to 4,000, calculated from the functionality and the hydroxyl group content. When mixtures of different polyhydroxyl compounds are used, the hydroxyl functionality and molecular weight are based on the statistical average values of the mixtures. Accordingly, the individual components of these mixtures may have hydroxyl functionalities and particularly molecular weights outside the given range.

Suitable polyhydroxyl compounds include the polyester polyols known from polyurethane chemistry, the polyether polyols known from polyurethane chemistry and the simple, low molecular weight polyhydroxyl compounds also known from polyurethane chemistry which may be present in small proportions in the polyhydroxyl component. The polyether polyols are particularly preferred.

The polyester polyols include reaction products of polyhydric, preferably dihydric alcohols (optionally with the addition of trihydric alcohols), and polybasic, preferably dibasic carboxylic acids.

Instead of free polycarboxylic acids, the corresponding polycarboxylic acid anhydrides or corresponding polycarboxylic acid esters of lower alcohols or mixtures thereof may be used for the preparation of the polyesters. The polycarboxylic acids may be aliphatic, cycloaliphatic, aromatic and/or heterocyclic and may be unsaturated or substituted, e.g. by halogen atoms.

The following are examples of suitable carboxylic acids and their derivatives: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid and maleic acid anhydride. Examples of suitable polyhydric alcohols include ethylene glycol, propylene glycol-(1,2) and -(1,3), butylene glycol-(1,4) and -(2,3), hexanediol-(1,6), octanediol-(1,8), neopentylglycol, 1,4-bis-hydroxymethyl cyclohexane, 2-methyl-1,3-propane-diol, glycerol, trimethylolpropane, hexane- triol-(1,2,6), butane-triol-(1,2,4), trimethylolethane, diethylene glycol, triethylene glycol, tetraethylene glycol, dipropylene glycol and dibutylene glycol. The polyester polyols generally have acid numbers below about 5 and hydroxyl numbers of about 40 to 112.

Suitable polyether polyols include those obtainable by the polymerization of epoxides such as ethylene oxide, propylene oxide, butylene oxide, tetrahydrofuran, styrene oxide or epichlorohydrin, either each on their own, e.g. in the presence of Lewis catalysts such as $BF_3$, or by addition of these epoxides, optionally as mixtures or successively, to starting components containing reactive hydrogen atoms. Preferred epoxides are ethylene oxide and propylene oxide. The starter molecules include water or simple polyhydric alcohols of the type mentioned above as examples for the preparation of polyester polyols.

The simple, low molecular weight polyols optionally included in small quantities include the low molecular weight polyhydroxyl compounds already mentioned above in connection with the preparation of the polyester polyols. Monohydric alcohols such as ethanol, n-octanol or stearyl alcohol may also be used, provided that the average hydroxyl functionality is within the disclosed limits.

For the preparation of both the starting component (a1) according to the invention and for the preparation of the isocyanate prepolymers or semi-prepolymers optionally present in component (a2), the starting polyisocyanates and polyhydroxyl compounds exemplified above are reacted together in such quantities that the resulting prepolymers or semi-prepolymers have an isocyanate content of about 0.5 to 20% by weight, preferably about 5 to 20% by weight. This reaction is carried out in known manner, generally within a temperature range of about 0° to 100° C. Reaction products containing free isocyanate groups and urethane groups are obtained. These products may be accompanied by unreacted starting polyisocyanates (semi-prepolymers), depending on the amount of excess polyisocyanate used into the reaction. Starting component (a2) optionally used in the process according to the invention may be prepared by a one-shot process or the two individual components may be prepared separately and subsequently mixed together. In the one-shot process, the organic polyhydroxy compounds of which examples are mentioned above are reacted with an excess of a mixture of (i) polyisocyanate mixtures of the diphenylmethane series containing at least 20% by weight of 2,4'-diisocyanatodiphenylmethane and (ii) other polyisocyanates or polyisocyanate mixtures of the type exemplified above. In both methods of preparation of component (a2), the quantity of isocyanate prepolymers or semi-prepolymers based on polyisocyanate mixtures of the diphenylmethane series containing at least 20% by weight of 2,4'-diisocyanatodiphenylmethane and the quantity of the said polyisocyanate mixtures (one-shot process) are calculated so that the resulting component (a2) contains at least 3% by weight, preferably at least 10% by weight of prepolymers or semi-prepolymers (a1) according to the invention. Since the prepolymers and semi-prepolymers of component (a1) may be used in their pure form for the process according to the invention, there is no upper limit to the amount of such prepolymers or semi-prepolymers contained in component (a2). However, it is preferred, when starting component (a2) is used instead of starting component (a1), that the mixtures contain up to about 20% by weight of prepolymers or semi-prepolymers according to the invention based on polyisocyanate mixtures of the diphenylmethane series containing 2,4'-diisocyanatodiphenylmethane. Apart from this consideration, the polyhydroxyl compound used for preparing the prepolymers or semi-prepolymers (a1) according to the invention may be either identical to or different from the polyhydroxyl component of the other prepolymers or semi-prepolymers.

The starting component (b) used in the process according to the invention includes any aromatic diamines having at least one alkyl substituent in the ortho position to each amino group, in particular diamines having at least one alkyl substituent in the ortho position to the first amino group and 2 alkyl substituents each with 1 to 4, preferably 1 to 3 carbon atoms in the ortho position to the second amino group. Those which have an ethyl, n-propyl and/or isopropyl substituent in at least one ortho position to each amino group and optionally methyl substituents in other ortho positions to the amino groups are particularly preferred.

The following are examples of such diamines: 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, mixtures of the last two mentioned diamines, 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane, 3,5-diethyl-3',5'-diisopropyl-4,4'-diaminodiphenylmethane, 1-t-butyl-3,5-dimethyl-2, 4-diaminobenzene, 1-t-butyl-3,5-dimethyl-2, 6-diaminobenzene and any commercial mixtures of the last two mentioned diamines. 1-methyl-3,5-diethyl-2,4-diaminobenzenes and mixtures thereof with 1-methyl-3,5-diethyl-2,6-diaminobenzene which generally contain up to about 35% by weight, based on the total mixture of the 2,6-isomer are particularly preferred as starting component (b) according to the invention.

In the process according to the invention, starting component (a1) or starting component (a2) is reacted with component (b). These components are used in such proportions that the equivalent ratio of (i) isocyanate groups in the prepolymers or semi-prepolymers (a1) according to the invention (which are based on polyisocyanate mixtures of the diphenylmethane series containing at least 20% by weight of 2,4'-diisocyanatodiphenylmethane) to (ii) amino groups in component (b) is about 0.5:1 to 50:1, preferably about 1:1 to 20:1, provided that the equivalent ratio, based on all of the isocyanate groups on the one hand and amino groups of component (b) on the other hand is at least 10:1. This means that if prepolymers or semi-prepolymers (a1) according to the invention are used exclusively, the aforesaid equivalent ratio must be at least 10:1. When component (a2) (based on mixtures of prepolymers or semi-prepolymers (a1) according to the invention with other prepolymers or semi-prepolymers) are used, the equivalent ratio, based on all the isocyanate groups, must also be at least 10:1, but in this case the equivalent ratio, based on the prepolymer or semi-prepolymer component (a1) according to the invention, may be as low as about 0.5:1. The degree to which the binder is rendered thixotropic depends mainly on the proportion of reaction products containing urea groups as obtained by the reaction of component (a1), which may be present as a component of the mixture (a2), with component (b). The quantity of individual starting materials required for producing the desired thixotropic effect can therefore be determined by a few preliminary tests.

The process according to the invention is preferably carried out at room temperature, with or without suitable inert, preferably apolar or only slightly polar lacquer solvents such as petroleum hydrocarbons, xylene, toluene or mixtures of such solvents. However, the reaction is preferably carried out without such solvents.

Known catalysts for accelerating the isocyanate addition reaction may in principle be used. Suitable catalysts for this purpose include tin compounds such as dibutyl tin dilaurate or tin(II)octoate. Other catalysts are described in "Kunststoff Handbuch", Volume VII, published by Becker and Braun, Carl Hanser Verlag, Munich 1983, on pages 92-98. The catalysts are used, if at all, in a quantity of about 0.001 to 10% by weight, preferably about 0.002 to 0.1% by weight, based on the total quantity of reactants.

If mixtures (a2) are used as starting materials in the process according to the invention and prepolymers or semi-prepolymers based on polyisocyanates containing aliphatically or cycloaliphatically bound isocyanate groups are present in addition to the prepolymers or semi-prepolymers (a1) according to the invention, it may be assumed, in view of the much higher reactivity of aromatically bound isocyanate groups, that component (b) will react primarily, i.e. to a large extent selectively, with the aromatically bound isocyanate groups unless amine is used in excess of these isocyanate groups. The process according to the invention may, however, also be carried out with mixtures (a2) in which the isocyanate groups have a similar reactivity to amino groups, e.g., mixtures of prepolymers or semi-prepolymers (a1) according to the invention with prepolymers or semi-prepolymers based on 2,4-diisocyanatotoluene. In this case, the amino groups of component (b) presumably react both with the isocyanate groups of the prepolymers or semi-prepolymers (a1) according to the invention and with the isocyanate groups of the prepolymers or semi-prepolymers which may be present in component (a2). It is surprisingly found that the thixotropic effect according to the invention is also obtained in this case. However, when none of the prepolymers or semi-prepolymers are of the type set forth in component (a1), such as prepolymers or semi-prepolymers based on 2,4-diisocyanatotoluene, this effect is not observed.

The products of the process according to the invention are generally liquids with thixotropic properties at room temperature, especially if the preferred starting materials are used. They are suitable as binders for the preparation of coating and sealing compounds ready for use, but are also suitable for use as agents imparting thixotropic properties to other binders, in particular to other prepolymers containing free isocyanate groups. Thus, for example, the products according to the invention based on starting components (a1) and (b) may subsequently be mixed with other prepolymers containing free isocyanate groups, for example those used as component (a2), in order to impart thixotropic properties to the resulting mixture.

The usual auxiliary agents and additives may be added to the products according to the invention for the preparation of coating and sealing compounds ready for use. Examples of such additives include plasticizers, extenders, solubilizing agents, fillers, pigments, age retardants and special additives for producing particular properties such as silanes for improving the bonding properties. Flame retarding additives may be added for fire protection, e.g. aluminum hydroxides, aluminum trioxide or halogenated additives such as powdered PVC. The electric conductivity of the materials may be improved, for example, by incorporating graphite or metal powders. Powdered rubber or hollow spheres may also be added. Air drying coating and sealing compounds with thixotropic properties ready for use may be obtained by these means.

The following examples serve to illustrate the invention. All percentages are percentages by weight.

EXAMPLES

Example 1

Four parallel experiments, Experiments (a) to (d) were carried out. In each, a polyether polyol having an average molecular weight of 4,800 and OH number of 35 was prepared by the propoxylation of trimethylolpropane and reacted with the diisocyanates set forth in the Table to produce the corresponding semi-prepolymers having an isocyanate content of 9%. The reaction was carried out at 80° C. for 24 hours. The abbreviations used in the Table have the following meaning:

2,4'-MDI = 2,4'-diisocyanatodiphenylmethane
4,4'-MDI = 4,4'-diisocyanatodiphenylmethane
2,4-TDI = 2,4-diisocyanatotoluene
IPDI = 1-isocyanato-3,3,5-trimethyl-5-isocyanatomethyl-cyclohexane.

TABLE

| | a | b | c | d |
|---|---|---|---|---|
| Polyol | 259 g | 259 g | 259 g | 259 g |
| 2,4'-MDI } 50/50 Blend | 113 g | — | — | — |
| 4,4'-MDI | | | | |
| 4,4'-MDI | — | 113 g | — | — |
| 2,4-TDI 100% | — | — | 78 g | — |
| IPDI | — | — | — | 100 g |

100 g of each of the semi-prepolymers prepared as described above were mixed with 0.7 g of 1-methyl-3,5-diethyl-2,6-diaminobenzene (NCO/NH equivalent ratio 15:1) and the mixture was kept at room temperature for 1 hour. The flow properties of the individual samples were then assessed.

For this test, two parallel samples were in each case stirred in a Haake Rotation viscosimeter at a stirring speed of 5 sec$^{-1}$ and 1000 sec$^{-1}$ at 23° C. and the viscosities were determined at this temperature for each stirring speed. The results are summarized in the table below. The quotient of the two viscosities is a measure of the thixotropic character.

| | a | b | c | d |
|---|---|---|---|---|
| Viscosity (mPas) 5 sec$^{-1}$ | 30,000 | 32,000 | 9,000 | 2,800 |
| Viscosity (mPas) 1000 sec$^{-1}$ | 5,000 | 8,000 | 3,000 | 2,500 |
| Quotient | 6 | 4 | 3 | 1 |

Example 2

100 g of the semi-prepolymer from Example 1 (d) were mixed with 7 g of the semi-prepolymer from Example 1 (a) at room temperature. After the addition of 1.0 g of the diamine mentioned in Example 1 (NCO/NH ratio based on the isocyanate groups of semi-prepolymer (a1) = 1:1, based on the total quantity of isocyanate groups = 20:1) and subsequent storage at room temperature for 1 hour, a thixotropic binder having the following flow properties was obtained:

Viscosity (23° C.) at 5 sec$^{-1}$: 1 75,000 mPas
Viscosity (23° C.) at 1,000 sec$^{-1}$: 1 2,000 mPas
Quotient: 37.5.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of an air drying binder containing free isocyanate groups and having thixotropic properties which comprises reacting either
   (a1) a prepolymer or semi-prepolymer containing free isocyanate groups, having an isocyanate content of about 0.5 to 20% by weight and based on (i) a polyisocyanate mixture of the diphenylmethane series containing at least 20% by weight of 2,4'-diisocyanatodiphenyl methane and (ii) an organic polyhydroxyl compound having an average molecular weight of about 500 to 7,000 and an average hydroxyl functionality of about 1.5 to 6 or
   (a2) a mixture of said prepolymer or semi-prepolymer of (a1) and a prepolymer or semi-prepolymer containing free isocyanate groups, having an isocyanate content of about 0.5 to 20% by weight and based on (i) an organic polyisocyanate other than those set forth under component (a1) and having an average molecular weight below about 300 and (ii) a subequivalent quantity of an organic polyhydroxyl compound having an average molecular weight of about 500 to 7,000 and an average hydroxyl functionality of about 1.5 to 6, provided that at least 3% by weight, based on the total weight of component (a2) is a prepolymer or semiprepolymer of component (a1) with
   (b) an aromatic diamine having at least one alkyl substituent in the ortho position to each amino group
at an NCO/NH$_2$ equivalent ratio, based on the isocyanate groups of component (a1) or on the portion of component (a1) present in component (a2) and the amino groups of component (b), of about 0.5:1 to 50:1, provided that the equivalent ratio of isocyanate groups to amino groups, based on all of the isocyanate groups present in component (a1) or (a2) and the amino groups in component (b), is at least 10:1.

2. The process of claim 1 wherein said organic polyhydroxyl compound of component (a1) or (a2) has an average hydroxyl functionality of 2 to 4.

3. The process of claim 1 wherein said air drying binder comprises component (a2).

4. The process of claim 3 wherein component (a2) contains at least 10% by weight, based on the total weight of component (a2), of a prepolymer or semi-prepolymer set forth in component (a1).

5. An air drying binder containing free isocyanate groups, having thixotropic properties and prepared by a process which comprises reacting (a1) a prepolymer or semi-prepolymer containing free isocyanate groups, having an isocyanate content of about 0.5 to 20% by weight and based on (i) a polyisocyanate mixture of the diphenylmethane series containing at least 20% by weight of 2,4'-diisocyanatodiphenyl methane and (ii) an organic polyhydroxyl compound having an average molecular weight of about 500 to 7,000 and an average hydroxyl functionality of about 1.5 to 6 or (a2) a mixture of a prepolymer or semi-prepolymer containing free isocyanate groups, having an isocyanate content of about 0.5 to 20% by weight and based on (i) an organic polyisocyanate other than those set forth under component (a1) and having an average molecular weight below about 300 and (ii) a subequivalent quantity of an organic polyhydroxyl compound having an average molecular weight of about 500 to 7,000 and an average hydroxyl functionality of about 1.5 to 6, provided that at least 3% by weight, based on the total weight of component (a2), is a prepolymer or semi-prepolymer of component (a1) with (b) an aromatic diamine having at least one alkyl substituent in the ortho position to each amino group at an $NCO/NH_2$ equivalent ratio, based on the isocyanate groups of component (a1) or on the portion of component (a1) present in component (a2) and the amino groups of component (b), of about 0.5:1 to 50:1, provided that the equivalent ratio of isocyanate groups to amino groups, based on all of the isocyanate groups present in component (a1) or (a2) and the amino groups in component (b), is at least 10:1.

6. The air drying binder of claim 5 wherein said organic polyhydroxyl compound of component (a1) and (a2) has an average hydroxyl functionality of 2 to 4.

7. The air drying binder of claim 5 which is based on component (a2).

8. The air drying binder of claim 7 wherein component (a2) contains at least 10% by weight, based on the total weight of component (a2), of a prepolymer or semi-prepolymer set forth in component (a1).

9. A process for the preparation of a coating or sealant which comprises exposing the air drying binder of claim 5 to atmospheric moisture.

* * * * *